June 12, 1956 W. G. PFANN 2,750,262
PROCESS FOR SEPARATING COMPONENTS OF A FUSIBLE MATERIAL
Filed July 12, 1952 4 Sheets-Sheet 1

INVENTOR
W. G. PFANN
BY
Edwin B. Cave
ATTORNEY

INVENTOR
W. G. PFANN
BY Edwin B. Cave
ATTORNEY

INVENTOR
W. G. PFANN
BY Edwin B. Cave
ATTORNEY

June 12, 1956 W. G. PFANN 2,750,262
PROCESS FOR SEPARATING COMPONENTS OF A FUSIBLE MATERIAL
Filed July 12, 1952 4 Sheets-Sheet 4
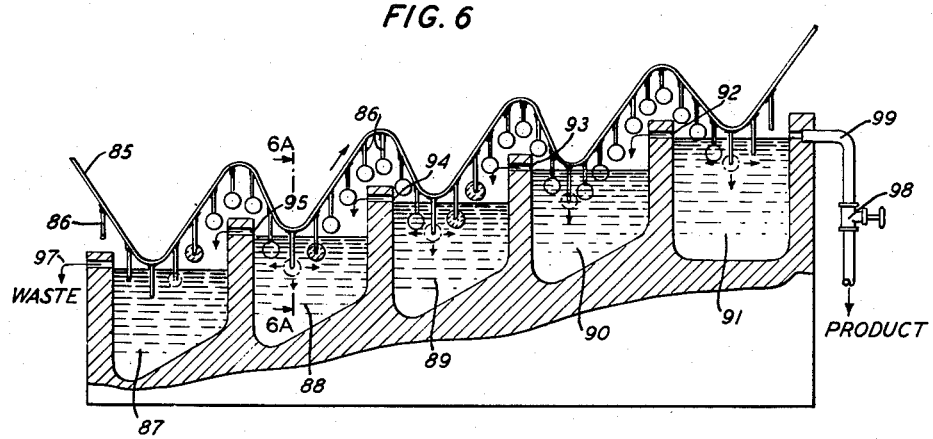
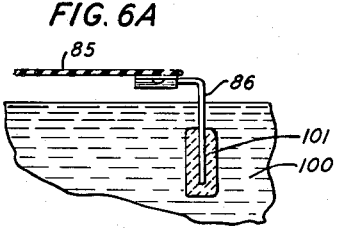
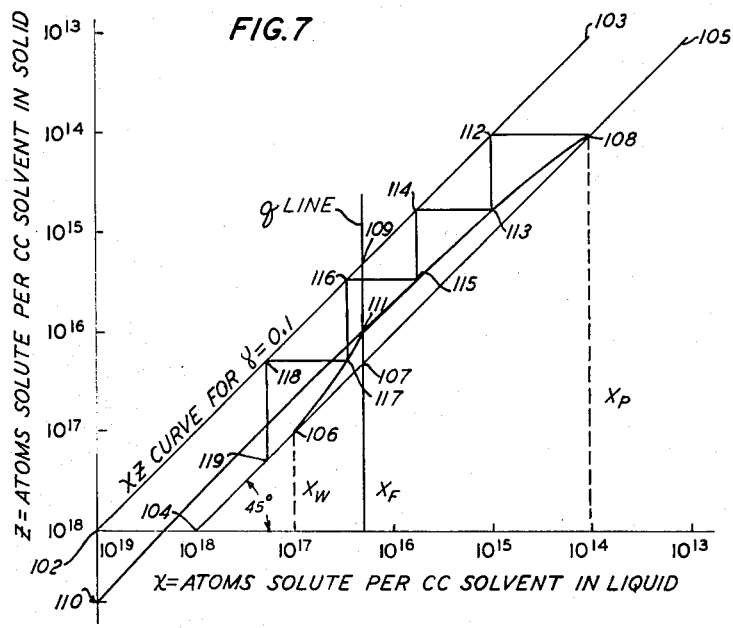
INVENTOR
W. G. PFANN
BY
Edwin B. Cave
ATTORNEY United States Patent Office 2,750,262
Patented June 12, 1956

2,750,262

PROCESS FOR SEPARATING COMPONENTS OF A FUSIBLE MATERIAL

William G. Pfann, Basking Ridge, N. J., assignor to Bell Telephone Laboratories, Incorporated, New York, N. Y., a corporation of New York Application July 12, 1952, Serial No. 298,553

5 Claims. (Cl. 23—223.5)

This invention relates to processes of treating solvent-solute systems, for the purpose of producing material having desired concentrations of major and minor ingredients. The processes of this invention utilize variations in solute solubility in adjoining liquid and solid phases in metals and their alloys, in salts and in any solute-solvent system which can be caused to undergo liquid-solid transformation without resulting in undesired changes in the chemical properties of the materials undergoing treatment. In one specific embodiment the process of the present invention is applied to treating elemental semi-conductive materials, such as silicon and germanium, so as to control their electrical properties.

The processes described may be utilized for refining semiconductive material so that it may be used in semiconductor amplifiers of the type disclosed in United States Patent 2,524,035, granted October 3, 1950 to J. Bardeen and W. H. Brattain. The processes described may be utilized in purifying a major ingredient, in the recovery of a minor ingredient or in the separation of two or more desired ingredients in any fusible system in which the solute concentrations in different adjoining phases of the material are different at equilibrium.

In United States patent application Serial No. 256,791, filed November 16, 1951 by the present applicant, the use of traveling molten zones for the treatment of fusible materials was described. Among the purposes there noted for these processes known as "zone-melting" are the purification of major ingredients, the concentration of minor ingredients and, generally, the controlled redistribution of ingredients in various systems there listed. It is one of the purposes of this invention to apply the principles there developed to certain continuous or quasi-continuous processes which may be more feasible on a commercial basis. In addition, this invention involves new principles, beyond the scope of the batch processes of the prior application. The most important of these new principles is that of reflux. Primarily, the processes of this invention, like those described in the aforesaid application, Serial No. 256,791, utilize the solid-liquid transformation and the repeated passage of material through solid and molten states.

Wherever the terminology "impurity" or "significant impurity" is used in the description or claims directed to this invention, it is to be understood that reference is being made to a solute of the system there under consideration. Such "impurities" may be desirable or undesirable and, further, may be present or not before the material undergoes treatment. The terminology "significant impurity" or "significant solute" where used in connection with semiconductors has reference to solutes which affect the conductivity type of the semiconductor under consideration. Solutes which have the effect of adding free electrons to the system and therefore tend to effect N-type conductivity are known as donors and those which tend to build up a deficiency of free electrons are known as acceptors. Examples of donors and acceptors for semiconductors of group IV of the Periodic Table according to the system of Mendelyeev such, for example, as silicon and germanium, are respectively those elements of groups V and III of the same table. For a comprehensive discussion of the theory of such semiconductors, see "Electrons and Holes in Semiconductors" by W. Shockley, D. Van Nostrand, 1950.

For simplicity of this description, the purification of a substance such as germanium containing an impurity such as arsenic which lowers the melting point of the germanium will be discussed. For such systems, $\gamma$ is less than 1.

For the purposes of this description, $\gamma$ will be considered to be a proportionality constant equal to the ratio of the concentration of a minor ingredient in the freezing solid to that of the same minor ingredient in the liquid in contact with said solid. For the purposes of this description, $\gamma$ may be determined from the following equation:

$$\gamma = \frac{C}{C_o(1-E)^{\gamma-1}} \qquad (1)$$

where $C_o$=the mean solute concentration in the starting material,
$E$=the fraction which has been solidified,
$C$=the concentration of solute in the solid at any point $\gamma$.

The above equation is for application to an alloy or other material which is undergoing the process known as "normal freezing." The derivation of this equation may be found in "Transactions of the American Institute of Mining and Metallurgical Engineers," volume 135, page 85 (1939) by A. Hayes and J. Chipman. In this process fusible material in a molten state is allowed to freeze unidirectionally from one end to the other at a rate sufficiently slow to prevent entrapment of liquid and to permit substantial diffusion of solute in the liquid. The result under most conditions will be a segregation action which will concentrate the solute in one or the other end of the body. If the solute lowers the freezing point, that is, $\gamma$ is less than 1, then the major portion of the solute will be concentrated in the last region to freeze. If $\gamma$ is greater than 1, the solute will be concentrated near the starting end. In order for Equation 1 to yield the theoretical $\gamma$ for the system under consideration, the following assumptions must apply:

(a) Diffusion in the solid must be negligible,
(b) Diffusion in the liquid must be almost instantaneous,
(c) $\gamma$ must be substantially constant (this condition applies where the material undergoing treatment is a semiconductor such as germanium containing significant impurities and of a purity of the order found in semiconductor devices).

In any actual process $\gamma$ may only approach, but will never attain, its theoretical value. The effect of any conditions which vary from the assumptions above made is to cause $\gamma$ to approach 1. The following conditions will have the effects noted on the actual values of $\gamma$:

(a) Any amount of diffusion in the solid state, or any lack of it in the liquid state, causes $\gamma$ to approach 1.
(b) Stirring has the effect of increasing diffusion in the liquid state and, therefore, of causing the actual value of $\gamma$ of the system under consideration to approach its theoretical value.
(c) Formation of dendrites in the freezing substance has the effect of decreasing the diffusion in the liquid state and, therefore, of causing $\gamma$ values of the system under consideration to approach 1. Note that sequentially increasing the rate of advance of the solid-liquid interface will increase $\gamma$ for values less than 1 and decrease values of $\gamma$ greater than 1. Some factors which affect the actual value of $\gamma$ have been discussed in the aforementioned paper by A. Hayes and J. Chipman.

(d) It would appear that the higher the temperature gradient from the liquid zone to the solid material the higher the effective rate of diffusion in the liquid state. This, therefore, would also have the effect of causing the $\gamma$ value of the system under consideration to approach its theoretical value.

For any process utilizing the liquid-solid transformation as a means for altering solute distribution in a solute-solvent system the following generalization may be made:

The greater the absolute value of $(1-\gamma)$, the greater is the difference between the solute concentration in adjoining phases at equilibrium. Purification for either system will necessarily be more efficient the greater is the differential between the actual $\gamma$ value and one.

In its simplest form a process of aforesaid application Serial No. 256,791 is the feeding of a charge of solute concentration $C_o$ continuously through a stationary ring heater which produces a stationary molten zone. In such a process the first concentration to leave the zone (to freeze out) will be $\gamma C_o$. As the process continues solute will accumulate in the molten zone and eventually raise its concentration to $C_o/\gamma$ at which time the concentrations leaving and entering the zone will be the same and equal to $C_o$ and refining will no longer occur. To operate such a refiner on a quasi-continuous basis so as to produce a concentration not greater than $C_f$ where $C_f$ is greater than $\gamma C_o$ and less than $C_o$, it is necessary merely to prevent the concentration in the molten zone from rising to a value greater than $C_f/\gamma$. Various means of accomplishing this exist.

(a) Quickly siphon off all the liquid in the zone through a heated tube when the concentration of the liquid rises to $C_f/\gamma$ or to some arbitrary value less than $C_f/\gamma$.

(b) Quickly advance the charge a little over one zone-length so as to cause the molten zone to freeze outside the heater. This impure region can later be sawed off or be otherwise removed from the purifying material.

While such procedures as (a) and (b) above are simple for one molten zone (constituting one stage of purification or separation), they become more difficult as the number of zones or stages is increased.

One object of the present invention is to obtain the advantages of the zone-melting process on continuous apparatus and to eliminate the need for interrupting the process at intervals to remove accumulated solutes from the molten zone. The present invention is continuous in the sense that solids are removed from the zones steadily throughout the process so as to result in a steady-state in which the zones and the solids emerging from them are of increasing impurity stepwise throughout the apparatus and in which the final concentration of the product does not vary.

Due to the similarity of the present invention to continuous distillation, terminology from this practice will be used to a considerable degree. The processes of this invention use "reflux," that is, a counter-current or "down-the-column" flow of a portion of the purified product. In the processes here to be described this reflux generally occurs in the form of a liquid phase flowing backward while solid phase flows forward.

Briefly, in the process of the present invention a series of tanks or chambers containing molten material are arranged in series. Solid enters each tank, melts therein, then refreezes in a purer state, emerges and advances to the next tank in which it is immersed and the process is repeated. At appropriate times during the cycle, feed is introduced and product and waste are withdrawn in intermittent fashion. In most species of the present invention the act of immersing the solid also causes a flow of reflux liquid in a backward direction, the flow occurring by gravity overflow due to the displacement of liquid by the entering solids and by the overflow of reflux from the last tank.

The invention can be better understood by reference to the accompanying drawings in which:

Fig. 6 is a type of apparatus using gravity overflow and in which the carriers are affixed to a continuous belt;

Fig. 6A is a view of a carrier usable on the apparatus of Fig. 6; and

Fig. 7 is a plot illustrative of a calculation by means of which, when given the reflux ratio and the compositions of the feed, product and waste, the necessary number of stages (tanks) may be computed.

Figure 1A:
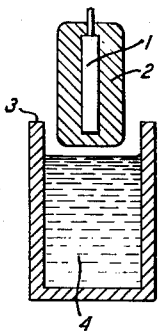
Figs. 1A, 1B, 1C, 1D and 1E show the manner of freezing and melting and show a carrier together with the material undergoing treatment, respectively, just before the carrier is immersed in the molten material, immersed, melted, refrozen, and withdrawn from a chamber containing molten material.
Figure 1B:
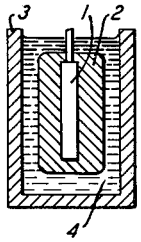
Figure 1C:
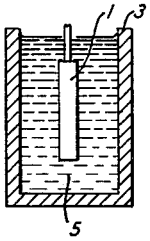

Fig. 1A shows the carrier just before it dips into a tank of molten material. In this figure, carrier 1 carrying a deposit of material 2 under treatment is about to dip into tank 3 containing molten material 4. In Fig. 1B, carrier 1 has dipped into tank 3. Since this is a representation taken at the very instant after carrier 1 has been submerged into molten body 4, deposit 2 has not yet started to melt. In Fig. 1C, the deposit has been melted and the material brought in by the carrier has been added to the molten material which was in tank 3. The resultant body 5 is of a composition different from body 4 as will be discussed below.

Figure 1D:
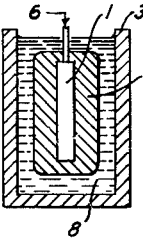
Figure 1E:
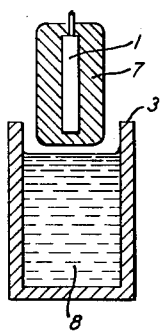

In Fig. 1D, the carrier 1 has been cooled as by passing coolant into gas or liquid intake 6 so that a new deposit 7 has formed on carrier 1. The composition of this new deposit or coating may be determined from Equation 1 above set forth. Where $\gamma$ is less than 1, deposit 7 will contain less solute than original deposit 2. Possible compositions of coolant and other means of causing deposit 7 to form on carrier 1 will be discussed later. Fig. 1E shows carrier 1 with new deposit 7 withdrawn from tank 3.

Since the system is regulated so that the amount of feed material added to the system is equal to that withdrawn as product and waste, the liquid level of molten body 8 will be identical to that of molten body 4 of Fig. 1A. The composition in any tank upon immersing the solid, is changed by (a) melting solid, and (b) the reflux liquid. For a system in which the $\gamma$ of the solute in the solvent has a $\gamma$ value which is less than 1, the reflux liquid will be purer than that in the tank into which it enters.

To clarify the action which takes place in the tanks, it may be well to consider the situation in which there is no reflux. In such a situation, again when the $\gamma$ of the solute in the solvent is of a value less than 1, the solids leaving the tanks would be purer than the solids entering the tanks and, therefore, would cause an accumulation of solutes in the tanks (just as in quasi-continuous refining discussed supra).

In order to prevent this situation in the reflux recrystallization processes of the present invention, an amount of reflux is added to the tank from which the solid emerges so as to maintain the same desired composition in the tank. For equilibrium, the simple material balance dictates that the amount of solute and solvent entering a given tank in the form of solid going up the refiner plus liquid reflux going down the refiner should be identical to that material contained in the emerging solid plus the reflux liquid leaving the same tank.

Figure 2:
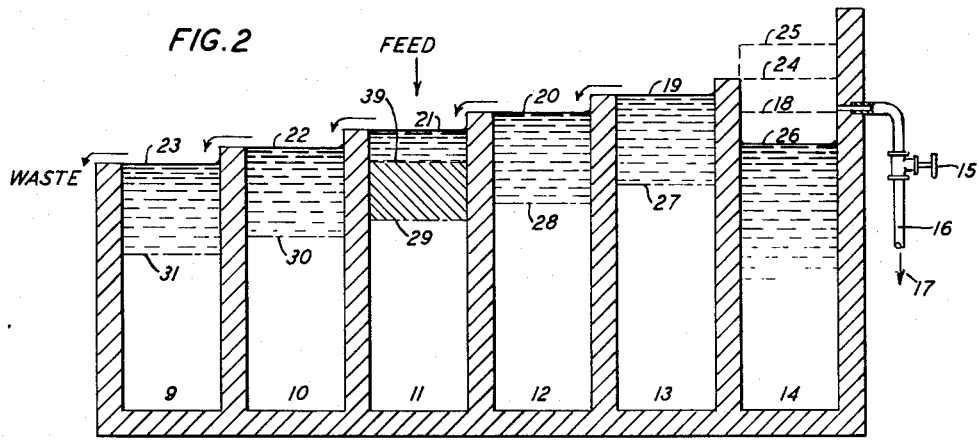
Fig. 2 shows one arrangement of tanks in which the process of the present invention may be carried out.

Fig. 2 is a graphical representation of a particular apparatus used to illustrate a process carried out in accordance with this invention. The arrangement of tanks 9, 10, 11, 12, 13 and 14 may represent a straight line or a circular array. In this figure the vessels are numbered consecutively as one proceeds to the "top" of the refiner. When all freezing bars and solids thereon, not shown, have been immersed, levels are at overflow levels 18 through 23 of the six tanks. Level 25 in tank 14 is hypothetical, but is shown to indicate the quantity of reflux and product. Amount 24–25 of liquid is reflux flowing from tank 14 to tank 13 and causing a flow backward from each tank in order, waste leaving tank 9 as overflow. In this example, 18–25 is the amount of solid carried forward on each freezing bar. Valve 15 at the exit of tank 14 which up to now has been closed, is opened, permitting amount 18–24 to be removed as product which flows through pipe 16 and through outlet 17. When the substance undergoing treatment is high melting, it will be necessary to heat the walls of pipe 16 to prevent clogging.

After or during the backward flow just described, the solids on the freezing bars melt and then refreeze by means to be described. The freezing bars together with frozen solid are then withdrawn in unison leaving levels 26, 27, 28, 29, 30 and 31 in tanks 14 through 9. (Note that the immersed volume of a bar without frozen solid thereon is taken as one unit 18–26 in tank 14.) After product has been withdrawn, feed is introduced at any desired tank (on the drawing it is introduced in tank 11). The amount of feed introduced in each cycle is the total of waste and product withdrawn. This amount is indicated by height 29–39 in tank 11.

The freezing bars are then advanced one tank and immersed. In one species of the process an empty bar is withdrawn from tank 14 so that no solid material is added to tank 9. There is thus a deficit of two units of liquid in tank 9, equal to amount 25–18 in tank 14. This is filled by a backward flow from tank 10 actuated by the feed which was introduced in tank 11 and by the reflux originating from tank 14. The sequence of operations and flows of liquid and movement of solids is now complete.

In the procedure above described, a carrier advances to the last tank 14 and melts its solid therein. The immersion causes a flow of reflux and a flow of product, the relationship between the two flows being separated in time and controlled by valve 15 at the outlet of tank 14. Where it is preferred, valve 15 may be eliminated by withdrawing only that amount of solid from tank 13 which is to be removed from 14 as product. With such a modification no flow of reflux will occur from tank 14 to tank 13. The amount of solid frozen in tank 13 may be controlled by constricting the flow tube supplying the coolant to the corresponding carrier. Other modifications can be readily visualized; for example, in a reciprocating system the carrier traveling between tanks 13 and 14 can be smaller in size than the others or alternately tank 13 and the contents thereof can be kept at an elevated temperature in relation to the contents of the preceding tanks. Similarly, the valve 15 can be eliminated by having simultaneous overflow of product and reflux from tank 14 through two orifices whose cross-sections are chosen so as to obtain the desired reflux ratio.

Figs. 3, 3A, 3B, 3C and 3D are directed to a circular array suitable for carrying out the processes of this invention. Six holes in a graphite or steel block 40 constitute tanks 41, 42, 43, 44, 45 and 46. A rotatable support 47, together with six freezing bars 48, 49, 50, 51, 52 and 53 is centered over the block 40 by means of guide bar 54 and guide holes 55, and the freezing bars 48 through 53 are lowered into tanks 41 through 46 containing portions of the material undergoing treatment in a molten form.

After whatever solid may have been present on the freezing bars has been melted, and after new portions of the material have been frozen, the bars are withdrawn, and, in one of the processes of this invention, advanced one tank in the direction of product flow (clockwise) as shown in the figure. Since there are six tanks, this is achieved by rotating support 47 through an arc of 60 degrees in a clockwise direction. In the figures shown this rotation is carried out by manually lifting and turning handle 56 through a 60-degree arc, engaging guide 54 in the next guide hole 55 in a counter-clockwise direction and lowering the support 47 until it rests on body 40. There is, of course, no intention to limit the invention to any such array and it is to be understood that a motor drive with a suitable mechanical means for lifting the carrier before and lowering it after the rotation, may be substituted.

In order to cause the molten material in the tanks to solidify on the freezing bars, coolant is circulated through the equipment as follows: through intake 57, stationary manifold tubes 58, ducts 59 in rotatable support 47, inner tube 60 in freezing bars 48 through 53, through the annular space 61 between the inner tube 60 and outer wall of freezing bars 48 through 53 and finally out exit ducts 62. It should be observed that in the particular configuration depicted in Figs. 3 through 3D, there is no manifold tube 58 corresponding with product tank 46. Since it is intended that product be withdrawn through outlet 63 in a molten form, it will then be observed that in this apparatus each of the freezing bars 48 through 53 carries solid matter from the tank from which it emerges to the subsequent tank in a clockwise direction with the exception of the freezing bar leaving product tank 46. In Fig. 3A, this freezing bar is numbered 53. As will be later discussed, a process comprising a different sequence of operations may be carried out on the apparatus of these figures. By this alternative, solid is frozen onto all the freezing bars in one position and is melted after a single rotation, after which it is rotated in the opposite direction to return each freezing bar to its original tank, in which solid is again caused to form on the freezing bars.

Figure 3:
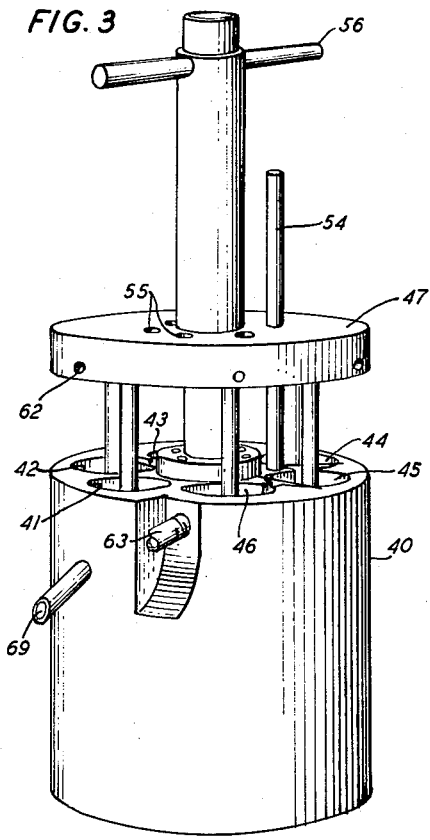
Figs. 3, 3A, 3B, 3C and 3D are views of an apparatus utilizing the process of the present invention, but with the tanks in circular array.
Figure 3A:
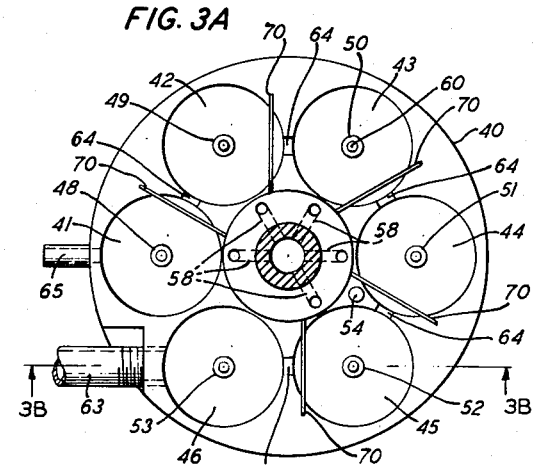
Figure 3B:
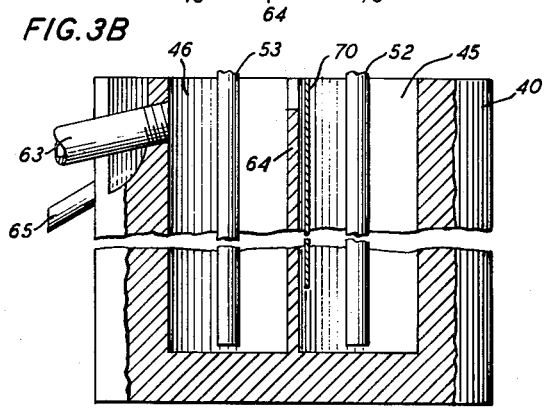
Figure 3C:
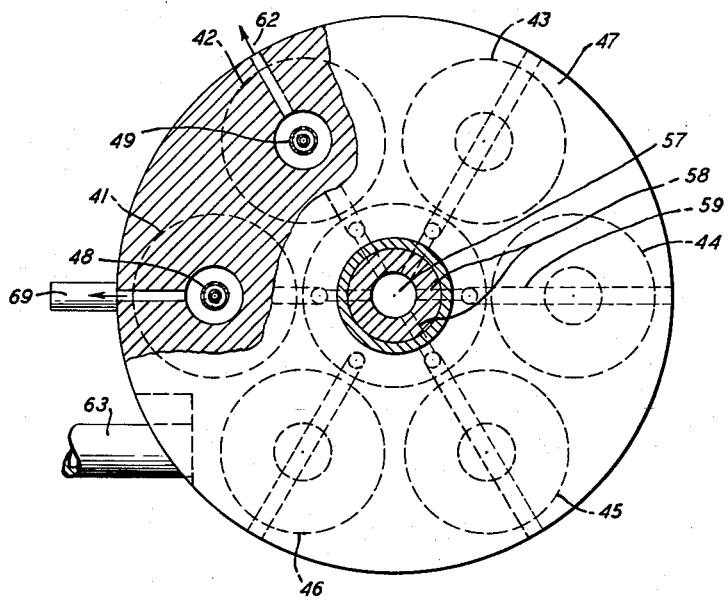
Figure 3D:
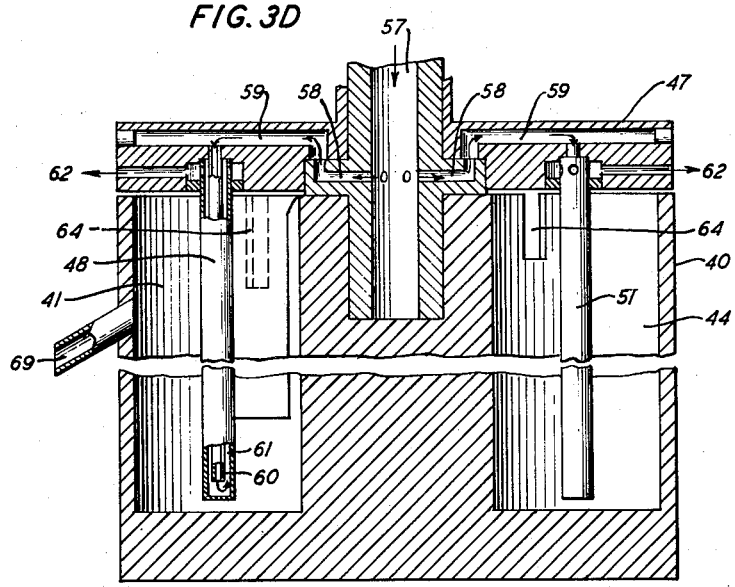

As has been discussed, the processes herein described are caused to be truly continuous by means of reflux of the material from tank to tank in a direction opposite to that of solid flow. In the particular apparatus depicted in Figs. 3 through 3D, this reflux is by means of gravity overflow originating from product tank 46, passing through successive troughs 64 into each succeeding tank and finally out through waste outlet 65. Since reflux is by gravity overflow, each of the succeeding troughs 64 is of increasing depth in the direction opposite to that of solid flow. In this particular apparatus the direction of increasing trough depth is from product tank 46 in a counterclockwise direction through tank 41 and out waste outlet 65.

Where certain systems are being treated on the apparatus of Figs. 3 through 3D, it is sometimes difficult to secure adequate mixing. Where this is encountered, it may be alleviated by means of mechanical mixing well known to the art. On the apparatus shown, improved dispersion of reflux liquid was secured by insertion of baffles 70, one of which may be clearly seen in Fig. 3B. These baffles are directly in front of the exit ends of troughs 64 and extend from the top of tanks 41 through 45 to within a short distance of the lower extremity of these tanks so that the reflux liquid is forced to travel down the constricted space between baffles 70 and the portion of the inner wall of the tanks closest to the exit of the reflux troughs, around the lower extremity of the baffle and then into the main body contained in the tanks. Where the system undergoing treatment is germanium together with any number of significant impurities, it is found that the insertion of such baffles is sufficient and that no other mixing means need be added.

In some systems, although the insertion of baffles will result in dispersion of reflux material, it will be necessary to resort to separate stirrers during the freezing operations. Examples of such systems are organic and viscous materials with low melting points.

At an appropriate time during each cycle, for example, while the freezing bars are advancing to the next subsequent tank, feed is added to any desired tank. Generally, feed is added in the form of molten material to one of the intermediate tanks, for example tank 43. Means for making this addition are not shown in the drawing since the feed can be simply ladled in. The considerations to be taken into account as to the preferred feed tank, are analogous to those concerned in determining the numbers of plates in the rectification and stripping sections in distillation. An adequate discussion of this subject may be found in "Elements of Chemical Engineering," 1936 edition, by Badger and McCabe, pages 323 to 376.

The freezing bars may be agitated within the tanks to increase stirring, thereby keeping the effective value of $\gamma$ as close as possible to its theoretical value. The sequence of operations may be as described in connection with Fig. 2 so that the bars are always advancing in a forward direction "up" the column. A different sequence in which the motion of the bars is reciprocating and which may be used for either a circular array as shown in the figures here under consideration or on a straight array, for example as depicted in Fig. 2, is as follows.

The sequence of operations is: freeze solid, withdraw bar plus solid, advance bar to the next tank, immerse, melt solid, withdraw empty bar, return to original tank, immerse, freeze fresh solid. For such a sequence, one tank more than the number of bars is required. The advantages are that in such a sequence all bars are cooled similarly and that, therefore, the complex system of manifold tubes 58 depicted, which was designed to keep the carrier in tank 46 always in a heated condition, is not required. Further, gravity overflow of reflux is simplified where a large number of tanks is needed (that is, a straight array can be used which is better from an overflow viewpoint).

The coolant may be any suitable fluid, liquid or gas. It may be preheated or precooled to a desired temperature so as to regulate the rate of growth of solid in the bars. It may be fed into all the freezing bars in parallel (by distinct routes from a common source) or in series (by which the same coolant flows through all the bars successively). The latter is more economical and may be used where the material should be grown slowly (with germanium, rates of under about 0.006 inch per second are favored to avoid entrapment of solute) or where the system under treatment has a low heat of fusion.

Freezing bars may assume any of a multitude of geometric shapes depending upon the particular characteristics of the system being run through the apparatus. In most of the processes herein described they will be hollow or contain ducts so as to provide for the circulation of cooling or heating fluid. Where the melting point is high so that heat transfer is a problem, preference will be toward greater surface area as offered by U-tubes or coils.

Coolant may be a gas, such as a hydrogen, nitrogen, air, helium, or a liquid such as water, mercury or other molten material.

The atmosphere in which the processes of this invention are carried out will depend on certain considerations which will be immediately apparent to those skilled in the art. For example, in the processing of germanium where is is desirable to utilize a protective atmosphere, that is, one intended to prevent the deleterious diffusion of unwanted impurities into the material being refined; relatively pure nitrogen, hydrogen, helium, argon, or mixture thereof, for example, may be used. Under some situations it may be preferable to run the processes of this invention in a vacuum. Where the material being processed is an aqueous solution or where an otherwise highly volatile solvent is present, it may be desirable to provide means for preventing evaporation of the solvent. For such a process a partial pressure of steam or other vapor sufficient to prevent evaporation of the solvent may be maintained in the atmosphere.

Heating means selected for use in the processes herein described will depend on the nature, especially the melting point of the material undergoing treatment. Various means suggest themselves: (a) the whole apparatus may be placed in a simple pot furnace; (b) gas flames can be applied; (c) windings of nichrome or other highly electrical-resistant material may be wound around the tanks and the various ducts through which the molten material is caused to travel; (d) heating may be inductive by means of the passage of high frequency induction current through windings around the tanks; (e) especially where the materials being processed are salts or organic materials subject to decomposition or other chemical transformation above certain critical temperature limits, it will be desirable to utilize water or oil baths. Where the refining system including tanks, bars, etc. is all glass, a water or other liquid bath is desirable as it will not obstruct observation of freezing.

Where it is desirable to expedite melting of the solid, hot gas or liquid may be circulated through the coolant lines. The temperatures in the tanks may be controlled in cyclic fashion so that they fall when freezing on the bars is in progress, and rise when melting is in progress, so that the time for these steps in the process is shortened.

Figure 4A:
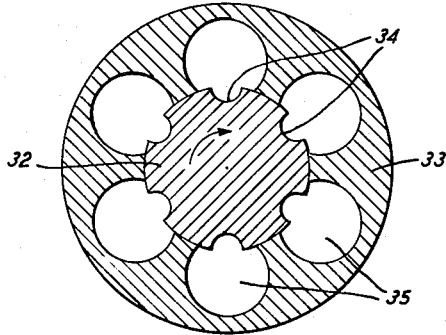
Figs. 4A and 4B are cross-sections of apparatus using types of reflux not dependent upon gravity.
Figure 4B:
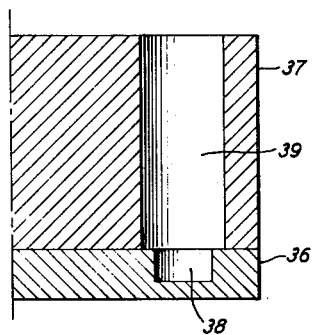

Up to this time, flow of molten material from one tank to another has been shown to take place by gravity overflow. Figs. 4A and 4B show alternates to this method. Fig. 4A shows an inner sliding reflux section 32 closely fitted to the main block 33 and having cavities 34 in contact with tanks 35. Section 32 rotates one step in each cycle carrying liquid with it. The direction of rotation is opposite to that of solid material flow. The reflux ratio is determined by the volume of the cavity and the rate of product withdrawn and may be chosen in accordance with the principles outlined in "Elements of Chemical Engineering," Badger and McCabe, 1936 in the section on distillation. An alternative form of sliding section 36 can be below the main block 37 having one hole 38 corresponding to each tank 39 as shown in Fig. 4B.

Figure 5:
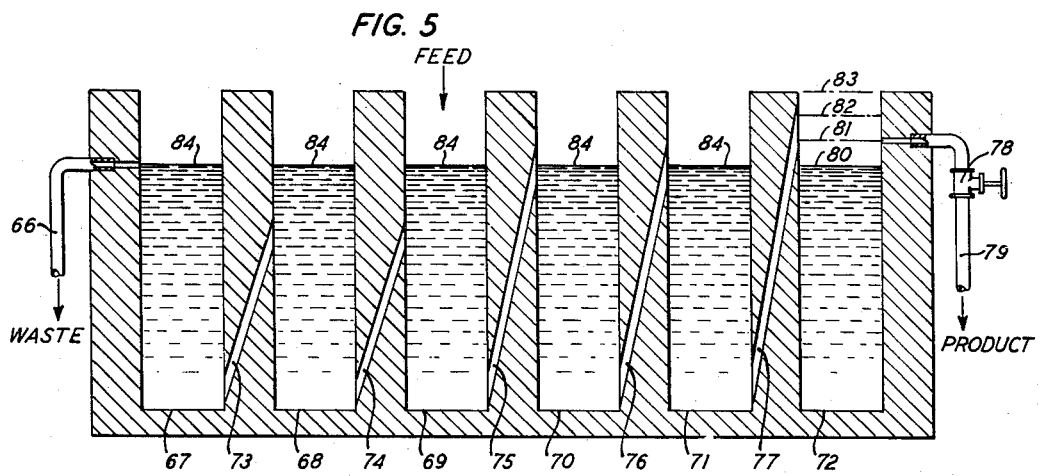
Fig. 5 is an alternate tank apparatus utilizing gravity reflux.

Fig. 5 is a graphic representation of yet another form by which molten flow between tanks 67, 68, 69, 70, 71, 72, takes place by means of thin connecting tubes 73, 74, 75, 76, 77. The tops of tubes 73 and 74 (before the feed tank) are lower than succeeding tubes to prevent feed from flowing forward. Tubes 73 through 77 are long and thin to minimize forward flow of reflux. A further precaution is to cause the levels in tanks 67, 68 and 69 to drop below the tops of tubes 73 and 74 when the freezing bars are withdrawn. All other details of this apparatus have a function identical to those of Fig. 2 so that valve 78, and outlet tube 79, are identical to valve 15 and tube 16 of Fig. 2 and waste tube 66 corresponds to the overflow at level 23 of tank 9 of Fig. 2. Levels 80, 81, 82, 83, have the same significance during different stages of the process as corresponding levels 26, 18, 24 and 25 of Fig. 2 where the operational sequence is as described in connection with the former figure. It should be noted, however, that levels 84 are identical and occur at that point in the sequence in which the levels of tanks 9, 10, 11, 12 and 13 of Fig. 2 are respectively at 23, 22, 21, 20 and 19.

Fig. 6 shows another way in which the desired flows of reflux and product may be made to occur. In this apparatus an endless belt 85 causes freezing bars 86 to progressively enter and leave tanks 87, 88, 89, 90, and 91. Reflux is by overflow through openings 92, 93, 94, 95. Cooling and freezing occur as the bars emerge from the liquid and pass into the cooler atmosphere. If a large number of freezing bars is used, operation is essentially continuous. Reflux ratios can be controlled by the relative cross-sections of the aforesaid overflow spout 92 and product outlet 99 (the latter may be by means of adjustment of valve 98). Waste is withdrawn through outlet 97; product passes through valve 98 and out outlet 99. During the process feed is introduced continuously at a desired intermediate tank. Fig. 6A is a view of one type of carrier 86 usable on the apparatus of Fig. 6 shown dipping into molten material 100 and carrying frozen material 101. This carrier is in the offset form shown so that it will offer no obstruction to pulleys or tracks (not shown) which may be used to impart motion and direction to the belt 84.

An alternate to the endless belt modification of the process described above in connection with Fig. 6, makes use of spiral carrier continuously entering and leaving the tanks, carrying solids with it. At the lower levels of the tanks the solids melt and, as that portion of the spiral carrier approaches the surface of the tank, solid begins to refreeze. It is here preferable to use a conveyor constructed of metal having as one of its properties good thermal conductivity. In its simplest form reflux is by overflow or any one of the alternates described, or to be described, can be used. Feed, product and waste flow simultaneously and continuously.

Fig. 7 will be referred to in connection with a discussion of the theory of continuous zone refining with reflux which follows.

The calculation of the number of tanks, the flows and compositions of feed, waste and product and reflux ratios, can be done in a manner similar to that used for making analogous calculations for continuous distillation columns which use the liquid vapor transformation, it being understood that a tank in the present process corresponds to a plate in the distillation process. The description of these calculations is given in "Elements of Chemical Engineering" by Badger and McCabe, McGraw-Hill, second edition, 1936. The terminology used therein will be used in part below. The relation of the theory of the zone processes to the McCabe-Thiele method of calculation in the above reference will be made clearer by the following analogy: In a distillation column vapor rises becoming richer in the more volatile component A and less rich in less volatile component B. The reflux of liquid flows downward, the reflux originating as a portion of the condensed vapor which emerges from the top of the column. Feed containing A and B in liquid or vapor form enters at the feed plate. Waste richer in B leaves at the bottom. The section above the feed plate is the rectification section and the section below it is the stripping section.

In the refiner, solid moves up the refiner (i. e., in a forward direction) becoming purer in solvent A as it does so (for the usual system in which the $\gamma$ of the solute solvent system is less than 1). Feed in liquid or solid form enters at the feed tank, waste richer in impurity B than the feed leaves at the bottom (first tank). Rectification occurs above the feed plate and stripping below it.

If the $xy$ curve of the system is known, the McCabe-Thiele method permits calculations for the distillation column to be made. For the purposes of such a calculation $x$ is the mol fraction of A in the liquid phase and $y$ is the mol fraction of A in the vapor phase in equilibrium with the liquid phase containing mol fraction $x$ of A. The numbers of theoretical plates in the rectification and stripping sections are calculated by a graphical stepping procedure, the steps being taken between the $xy$ curve and the operating line for a given system. The operating line for the rectification section is determined by the reflux ratio and the mol fraction of A in the distillate, $x_D$. The operating line extends from the point $x=x_D$, $y=x_D$ on the $x=y$ curve to its intersection with the $q$-line. The $q$-line is determined by the composition $x_F$ and the thermal condition of the feed. The operating line for the stripping section is determined by the composition $x_W$ of the waste and the intersection of the $q$-line with the operating line for the rectification section. Further details appear in the above-mentioned reference.

Fig. 7 is illustrative of a graphical method analogous to the McCabe-Thiele method by means of which apparatus for carrying out the processes of this invention may be designed. By the proper use of a plot similar to that of Fig. 7, and using the method to be described, unknowns in the operating processes of this invention may be calculated. For example, where the compositions of end products desired and the quantity of material to be treated are known, it is possible to determine a combination of theoretical tanks, reflux ratio, condition of feed, and location of feed tank to produce the desired results. Or conversely, where the equipment on which purification is to take place is already in existence so that the number of tanks is also a known quantity, the method to be described may be used for determining the proper reflux ratio and feed tank which will be most satisfactory for producing the desired concentrations of end products. There is a multitudinous variety of calculated results which may be obtained, some of which are disclosed by analogy in Badger and McCabe, cited above, others of which become apparent as the needs of the art develop, for example, by means of a variation of the method which would become apparent to those skilled in the art, the graphical calculation may be utilized for arranging the feed tank, condition of feed and reflux ratio, for obtaining either a minimum amount of solute in one end product or a maximum amount of solute in the other, on a given piece of equipment.

Referring now to Fig. 7, illustrative of the calculations which may be made on a plot of $z$ atoms of solute per cubic centimeter of solvent in the solid versus $x$ atoms of solute per cubic centimeter of solvent in the liquid, consider the following problem: A tank process such as, for example, any one of the processes herein described, which has a feed liquid composition $x_F$ and of known molal heat content, has one end product of composition $x_P$ (concentration of A in the liquid product withdrawn from the extreme tank in the direction of solid flow) and an end product $x_W$ withdrawn from the extreme tank in the opposite direction (concentration of A in the liquid product richer in solute A in the system in which the $\gamma$ value is less than 1) and operates with a reflux ratio of R mols per mol of product. The two unknowns to be determined by this graphical calculation are the number of theoretical tanks necessary to produce end products of compositions $x_P$ and $x_W$ and the location of the optimum feed tank. In carrying out the method of Fig. 7, one proceeds as follows:

(1) The equilibrium curve 102—103 and the $x=z$ diagonal 104—105 are plotted conventionally. Note that the $xz$ curve in the system here under consideration, that is for a $\gamma$ of 0.1, appears as a straight line parallel to the $x=z$ line on log-log coordinates indicating that the value of $\gamma$ is constant over the range of compositions shown.

(2) The $x=x_W$, $x=x_F$, and $x=x_P$ lines are all projected until their respective intersections 106, 107, 108 with the $x=z$ diagonal.

(3) $q$-line 107—109 is calculated from the molal heat content of the feed and is plotted by passing a straight line through point 107 and having a slope which may be determined by methods analogous to those described on pages 350–351 of Badger and McCabe. For the purposes of this calculation, the following guides for determination of the slope of the $q$-line are set forth. When the feed which is introduced is a liquid at its freezing point, so that no thermal disturbance results within the liquid stream of the apparatus, the $q$-line appears as a vertical projection 107—109 of Fig. 7. When feed is introduced as a solid at its melting point, the slope of the $q$-line is 0 and will be represented on the plot as a horizontal line passing through point 107. If the feed is mixed solid and liquid in equilibrium, the slope of the $q$-line will be upward and to the left. If the thermal condition of the feed is such that the heat content is higher than that of the liquid at its freezing point, the slope of the $q$-line will be upward and to the right and if the thermal condition of the feed is such that the heat content is less than that of the solid at its melting point, the slope of the $q$-line will be downward and to the left.

(4) The intercept $$\frac{x_P}{R+1}$$

is calculated and plotted on the $z$ axis as point 110. Operating curve 110—108 which would appear as a straight line on rectangular coordinates is then drawn. This establishes point 111 on the $q$-line.

(5) Point 111 is connected with point 106 to give operating curve 106—111 which latter would also appear as a straight line on rectangular coordinates.

(6) Starting at point 108 draw a series of rectangular steps 108, 112, 113, 114, 115 between equilibrium curve 102—103 and operating line 111—108 for the rectification section of the process. The steps are continued until point 111 is passed, this occurring at intersection 116 at Fig. 7. The vertical line 116—117 is then dropped to operating line 106—111 and this second operating line corresponding with the stripping section of the process is utilized until the last vertical line coincides with point 106 or a lesser value. In the calculation shown on Fig. 7 step 117—118—119 corresponds to the last tank in the stripping section.

The total number of steps is the total number of theoretical tanks in the process and the step straddling the $q$-line is the tank in which the feed should be introduced. Consequently, in the illustrative example of Fig. 7 there will be four theoretical tanks and the feed will be introduced in the second tank from the bottom.

In using the McCabe-Thiele method for calculations for the purification of germanium by the reflux recrystallization methods of this invention, a number of changes and simplifications have been incorporated:

(A) For impurities of interest in germanium, for example, significant impurities, such as arsenic, antimony, gallium, indium, aluminum, zinc and other impurities such as nickel and copper which affect carrier lifetime, the ratio of the solute concentrations in solid and liquid respectively at the interface at equilibrium is approximately a constant over a wide range of small concentrations. For solidification rates of the order of 0.001 inch per second, approximate values of $\gamma$ are 0.1 for arsenic, gallium and aluminum, 0.01 for antimony, and 0.001 for indium. Hence, the curve corresponding to the $xy$ curve of McCabe-Thiele for germanium containing such a solute is a straight line. This line appears on Fig. 7 as $xz$.

(B) The concentrations of interest numerically are those of the impurities which for the purposes of this specification are expressed in terms of atoms of impurity per cubic centimeter of germanium. This concentration is of interest in semiconductors such as germanium in that it affects the electrical conductivity, an important property of germanium when used in semiconductive devices such as transistors and rectifiers. A second important effect of impurities in germanium and other semiconductors is that they lower the lifetime of injected carriers. Impurities other than the significant impurities may be of this type. Electrical conductivity of germanium in the impurity range here under consideration, is directly proportional to the concentration of the significant impurity. Hence, $x$ will represent atoms per cubic centimeter of solute in the liquid and $z$ will represent concentration of solute in the solid at the interface at equilibrium expressed in the same units of atoms per cubic centimeter.

(C) Since ranges of several decades of concentration are of interest, it is convenient to plot the $xz$ curve and the McCabe-Thiele plot on log-log coordinates. A range of concentrations of interest for many applications of semi-conductors is from about $10^{12}$ to about $10^{18}$ atoms of significant impurity per cubic centimeter of semiconductor. As shown in Fig. 7 for a $\gamma$ of 0.1 the $xz$ curve is a straight line parallel to the $x=z$ or 45-degree curve. The operating lines, which are straight lines on the usual arithmetic plots, become on the log-log plot curves which are readily determined from the equations in the above reference.

In the refining of germanium, it is desired to reduce conductivity produced by significant impurities to a value approaching that corresponding to intrinsic conductivity. The value at which impurity conductivity equals intrinsic conductivity in germanium at 25° C. is about $3 \times 10^{13}$ carriers per cubic centimeter. Germanium available in normally pure form from commercial sources may have carrier concentrations of the order of $2 \times 10^{15}$ or $2 \times 10^{16}$ atoms per cubic centimeter. Scrap germanium which is to be purified by zone refining, may have even higher concentrations of conductivity-producing impurities. It should be noted that $3 \times 10^{13}$ atoms per cubic centimeter of germanium corresponds to about $7 \times 10^{-8}$ atomic per cent of impurity in germanium (an extremely small concentration).

In the calculation of Fig. 7 a product concentration $x_D$ of $1 \times 10^{14}$ atoms per cubic centimeter, a feed concentration $x_F$ of $2 \times 10^{16}$ atoms per cubic centimeter and a waste concentration $x_W$ of about $1 \times 10^{17}$ atoms per cubic centimeter were assumed. A reflux ratio R equal to 1.0, was assumed where:

$$R = \frac{L}{D}$$

and where $L$=flow of reflux down the refiner.
$D$=flow of product out at the top of the refiner.

At a vertical $q$-line (corresponding to the introduction of liquid feed at the temperature of the liquid in the feed tank), it is found that three theoretical tanks are needed in the rectification section and two in the stripping section. The flows F of feed, W of waste, and D of product in relative units are 10, 2 and 8, respectively.

In a refiner which operates intermittently as, for example, the apparatus of Fig. 2, the composition of the liquid in a given tank is regularly varying between certain limits and the solid which freezes from it, if germanium, is not usually in equilbrium with it. Hence, the McCabe-Thiele calculations are only approximations here although very helpful ones. By using a value of $\gamma$ determined by experiment for freezing conditions similar to those of the zone refiner, in plotting the $xz$ curves, a fairly close approximation to the calculation is assured.

Although in a practical sense, the capacity of any of the apparatus described in this specification is limited, solely by practical matters, such as dimensions of the tank and surface areas of the carriers, the following is given as an illustration of the rate of product flow in a refiner such as that of Fig. 2 for the purification of a material such as germanium to produce a product of a purity of a range such that it is usable in semiconductor devices. Assuming a freezing bar in the form of a tube of an outside diameter equal to a quarter of an inch and a length equal to eight inches, processing in tanks having an inside diameter of an inch and a quarter and a depth of approximately nine inches, and where it is desired to freeze a layer of a thickness of about a quarter of an inch at the bar so that the total outside diameter of the solid will be about three-quarters of an inch corresponding to a solid weight of germanium of about 0.52 pound, the following approximation will apply. Where freezing occurs at the rate of one-eighth inch per minute, so that freezing time is of the order of two minutes and where five minutes is allowed for a complete cycle, the forward travel of solid is equivalent to $$\frac{0.52}{5}$$

or 0.1 pound per minute. In the case in which 50 per cent of the solid is allowed to return as reflux and 50 per cent of it is withdrawn as product, the final rate of end product is 0.05 pound per minute or approximately three pounds per hour.

It is evident, however, that the apparatus described can equally well be used for a product yield of the order of either grams per hour or tons per hour so that the apparatus can be used for the commercial refining of metals such as silicon, germanium, aluminum, lead, zinc, tin, copper, silver, gold, titanium, zirconium, iron and many others. Indeed, as mentioned in the introduction to this specification, the processes described are applicable to the refining of any and all materials which are capable of being carried from one phase to another thermally and without other chemical or deleterious changes occurring and further in which the impurity or solute which it is sought to control has different concentrations in the two phases coexisting at equilibrium. The only changes which are necessary to adapt the processes described to the purification or control in other systems are mechanical changes which will be immediately apparent to those reading this specification. In the refining of less valuable materials where it is necessary economically to process large amounts, it is necessary only to increase all of the dimensions of the equipment, although it may be necessary to make certain allowances for variations in the thermal effects which will result when equipment sizes are varied. Such modifications are well known to design engineers working in the operation aspects of chemical engineering where the same problems must be overcome when passing from laboratory scale to pilot plant and again when going from pilot plant to commercial equipment. Where purifying materials by means of the variation in solubility of the impurities under consideration between the solid and the liquid phases for materials which, at room temperatures, are in the liquid phase, such, for example, as mercury, the critical problem is one of refrigerating rather than one of heating so that it may be that it will be necessary to pass refrigerant through the coolant chambers of the carrier, and to allow the melting steps to take place at room temperature. Similarly, there is no reason why the processes described may not be applied to materials which are normally found in the gaseous state.

In certain cases, it is desirable or feasible to produce fine crystals of a pure substance, for example, purification of table salt. In such cases crystallization can be made to occur in each tank by conventional means from many nuclei. In this use the freezing bar, described in its many modifications above, is replaced by a basket or a fine sieve which by moving upward collects all the crystals, withdraws them and immerses them in the next tank for remelting. It is necessary in such an apparatus to place strainers in the reflux paths to prevent backward travel of solids.

In many systems the separation factor $\gamma$ is not favorable, that is, its value does not differ sufficiently from 1 for effective separation. In such separations it is often advantageous to use a third substance as a solvent thereby obtaining greater separation analogous to the process known as "salting out" in fractional crystallization. The methods of this invention are ideally suited for handling of such three component systems. In such a process the feed probably in liquid form consists of A and B dissolved in C. It being desired, for example, to remove B from A, the product will be, for example, A dissolved in C and containing very little B, whereas the waste in the same example will be A and B dissolved in C containing a higher percentage of B than the feed. The desired component may then be removed from C as, for example, by processing it in accordance with the description of this invention or, where the third substance is a comparatively volatile one, such as water, some organic solvents, and some metal solvents (e. g., zinc, cadmium, mercury) it may be removed by evaporation. When the system undergoing treatment is an alloy, the third component will be a metal, while in non-metal systems suitable third solvents may be water, organic solvents, or many other well-known substances used in this way in fractional crystallization work (see Weissberger Technique of Organic Chemistry, volume 3, 1950, Interscience Pub., N. Y.).

In the purification of semiconductive materials, such as germanium and other elements of the fourth group of the table, according to Mendelyeev, containing an impurity which raises its melting point (that is, a solute solvent system having a $\gamma$ of value greater than 1, such for example, as boron or silicon in germanium), the refiner may be operated as described above except that the purer germanium will emerge at the bottom and the richer material at the top of the refiner. Where two or more impurities are present, some of which lower and some of which raise the melting point, it may be necessary to rerun the exit materials separately in similar apparatus.

What is claimed is:

1. The process comprising inserting in at least one of a series of receptacles containing a solution comprising a major and a minor ingredient, a hollow carrier together with a solid body comprising the same ingredients, causing said solid body to melt within the receptacle, passing coolant through said carrier and thereby causing a portion of the molten material within the receptacle to freeze on said carrier and at least once advancing said carrier together with the solid body to another receptacle and repeating the aforesaid series of steps, withdrawing as product a portion of the material from within a receptacle, causing a flow of molten material from receptacle to receptacle in a direction opposite to that of solid transfer, withdrawing as waste a portion of molten material from the final receptacle of said molten flow and adding, as feed, material comprising said solution in an amount equal to that of product plus waste.

2. In a series of at least three receptacles containing molten material of a fusible system containing at least two ingredients, the process comprising, causing a solid material transfer in one direction by at least once freezing a portion of material within a receptacle on a hollow immersed carrier by passing coolant into said carrier, withdrawing said carrier together with said portion, advancing said carrier together with said portion to a subsequent receptacle and melting said portion therein, while causing a reflux flow of molten material from receptacle to receptacle in a direction opposite to that of solid material transfer, withdrawing from the extreme receptacle in the direction of reflux flow a portion of molten material and adding to an intermediate receptacle as feed molten material undergoing treatment.

3. The process of claim 1 in which the material undergoing treatment contains as a major ingredient an element selected from the group consisting of silicon and germanium and as a minor ingredient an element selected from the group consisting of boron, gallium, indium, aluminum, thallium, antimony, arsenic, bismuth and phosphorus.

4. The process of claim 2 in which the material undergoing treatment contains as a major ingredient an element selected from the group consisting of silicon and germanium and as a minor ingredient an element selected from the group consisting of boron, gallium, indium, aluminum, thallium, antimony, arsenic, bismuth and phosphorus.

5. The process by which ingredients in a material of a fusible system are separated comprising melting in each of a first series of receptacles portions of said material together with a solvent in which at least two ingredients contained in the material undergoing treatment have varying solubilities, causing portions of the molten material so formed to freeze on hollow carriers by passing coolant into said carriers within the receptacles, advancing said carriers together with said frozen portions to subsequent receptacles, withdrawing solid portions of material so formed, as one product from the extreme receptacle in the direction of solid transfer, causing a flow of molten material in a reverse direction from receptacle to receptacle, withdrawing from the extreme receptacle in the reverse direction a portion of molten material, as a second product, while adding, as feed, portions of the material undergoing treatment together with the aforesaid solvent, disposing within a second series of receptacles one of said products in a molten state, causing portions of said molten material to freeze on hollow carriers immersed in said receptacles by passing coolant into said carriers, at least once advancing said carriers together with said frozen portions to subsequent receptacles, withdrawing a portion of frozen material from the extreme receptacle in the direction of solid transfer, causing a flow of molten material from receptacle to receptacle in a direction opposite to that of solid material transfer, withdrawing from the final receptacle in the direction of molten flow a portion of molten material while adding, as feed, an additional portion of the same one of said products of the first series of receptacles in an amount equal to solid plus molten material withdrawn.

References Cited in the file of this patent

UNITED STATES PATENTS

| | | |
|---|---|---|
| 1,666,440 | Coster | Apr. 17, 1928 |
| 1,778,018 | Blaylock et al. | Oct. 14, 1930 |
| 1,938,101 | Hall | Dec. 5, 1933 |
| 1,967,053 | Fingland | July 17, 1934 |
| 2,196,594 | Muskat | Apr. 9, 1940 |
| 2,602,763 | Scaff et al. | July 8, 1952 |
| 2,617,273 | Findlay | Nov. 11, 1952 |
| 2,622,115 | Carney | Dec. 16, 1952 |
| 2,679,539 | McKay | May 25, 1954 |

OTHER REFERENCES

Haugen and Watson: "Chemical Process Principles," part one copyright 1943, pages 111–114. Publ. by John Wiley and Sons, N. Y. C.